United States Patent [19]

Mizelle et al.

[11] Patent Number: 5,709,500
[45] Date of Patent: Jan. 20, 1998

[54] FURNITURE, FURNITURE MANUFACTURING METHOD, AND CONNECTOR ASSEMBLY

[76] Inventors: Ned W. Mizelle, P.O. Box 5985, High Point, N.C. 27262; Morton Snitzer, 4836-D Tower Rd., Greensboro, N.C. 27410

[21] Appl. No.: 428,717

[22] Filed: Apr. 25, 1995

[51] Int. Cl.⁶ .................................................. B25G 3/02
[52] U.S. Cl. .......................... 403/364; 403/378; 403/294; 403/292; 403/3; 16/386
[58] Field of Search ........................ 403/97, 108, 154, 403/161, 383, 334, 65, 68, 66, 83, 79, 91, 333, 378; 16/261, 266, 386

[56] References Cited

U.S. PATENT DOCUMENTS

| 19,076 | 1/1858 | Cornell | 16/386 |
|---|---|---|---|
| 607,607 | 7/1898 | Rimmelin . | |
| 1,261,713 | 1/1918 | Crook | 16/266 |
| 1,742,699 | 1/1930 | Fellows | 16/386 X |
| 2,291,078 | 7/1942 | Harris . | |
| 2,858,582 | 11/1958 | Toulmin, Jr. . | |
| 3,813,152 | 5/1974 | Hampel | 351/153 |
| 3,836,217 | 9/1974 | Shiina . | |
| 3,926,529 | 12/1975 | Brooks . | |
| 3,938,296 | 2/1976 | Weiss . | |
| 4,148,106 | 4/1979 | Gallien . | |
| 4,191,113 | 3/1980 | Hoberg . | |
| 4,208,850 | 6/1980 | Collier . | |
| 4,435,103 | 3/1984 | Becker et al. . | |
| 4,630,333 | 12/1986 | Vickers | 16/386 X |
| 4,850,081 | 7/1989 | Grant | 16/341 X |
| 4,858,996 | 8/1989 | Blodee . | |
| 4,932,807 | 6/1990 | Rhodes | 403/334 |

FOREIGN PATENT DOCUMENTS

| 21793 | of 1900 | United Kingdom | 16/386 |
|---|---|---|---|

*Primary Examiner*—Anthony Knight
*Assistant Examiner*—Bruce A. Lev
*Attorney, Agent, or Firm*—Beveridge, DeGrandi, Weilacher & Young, L.L.P.

[57] ABSTRACT

A connector assembly for connecting components of knock-down furniture includes two connector blocks which are rigidly mountable on the furniture components, and a tapered pin which interconnects the two connector blocks. Each connector block includes parallel tongues which are rigidly supported on a base plate in spaced apart relation. The tongues of each connector block are positioned in the spaces between the tongues of the other connector block. Each tongue has a tapered pin-receiving opening which is aligned with the openings of the other tongues. The transverse dimensions of these openings decrease progressively from one tongue to another. The tapered pin extends through the pin-receiving openings and it frictionally engages the tongues with sufficient friction to prevent movement of the tapered pin relative to both connector blocks. The tongues of each connector block have edges which abut the base of the other connector block and are shaped to prevent relative pivoting movement between the connector blocks.

30 Claims, 6 Drawing Sheets

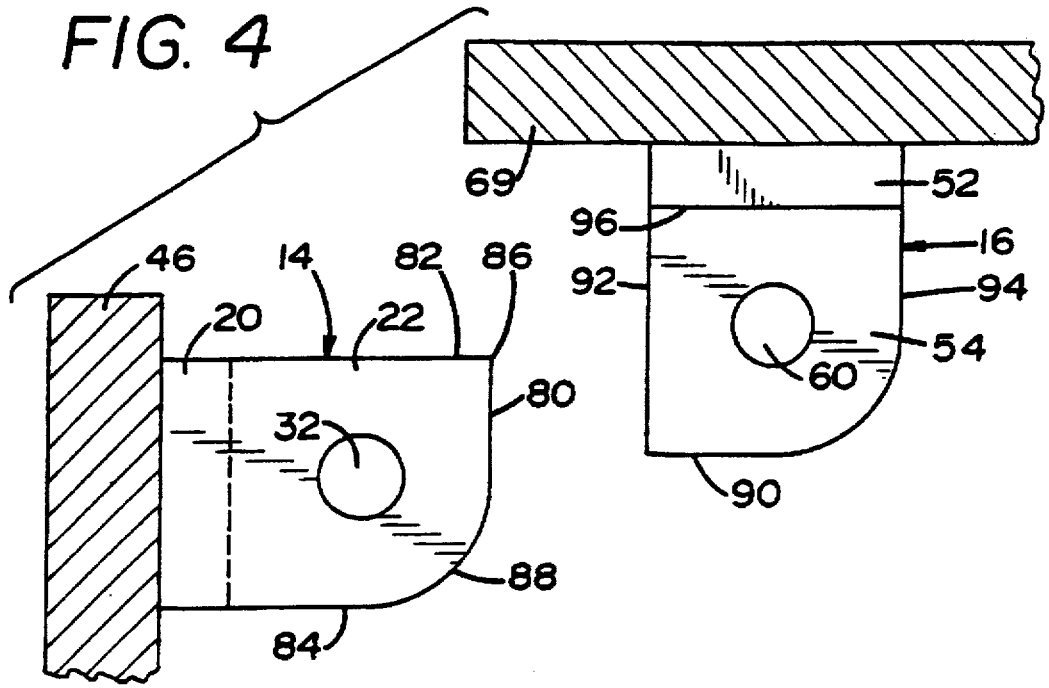
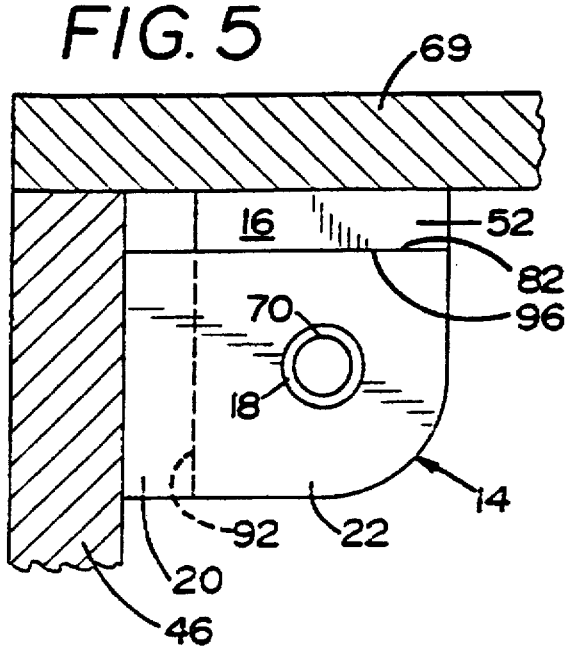
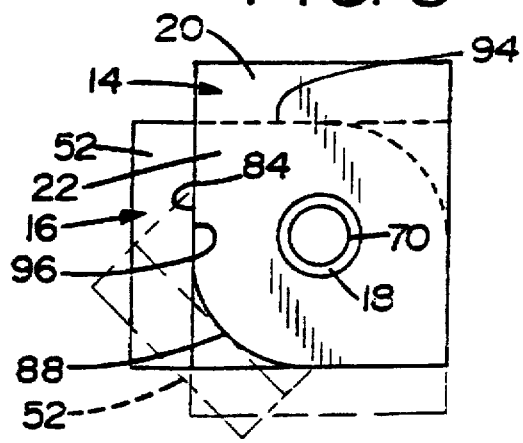

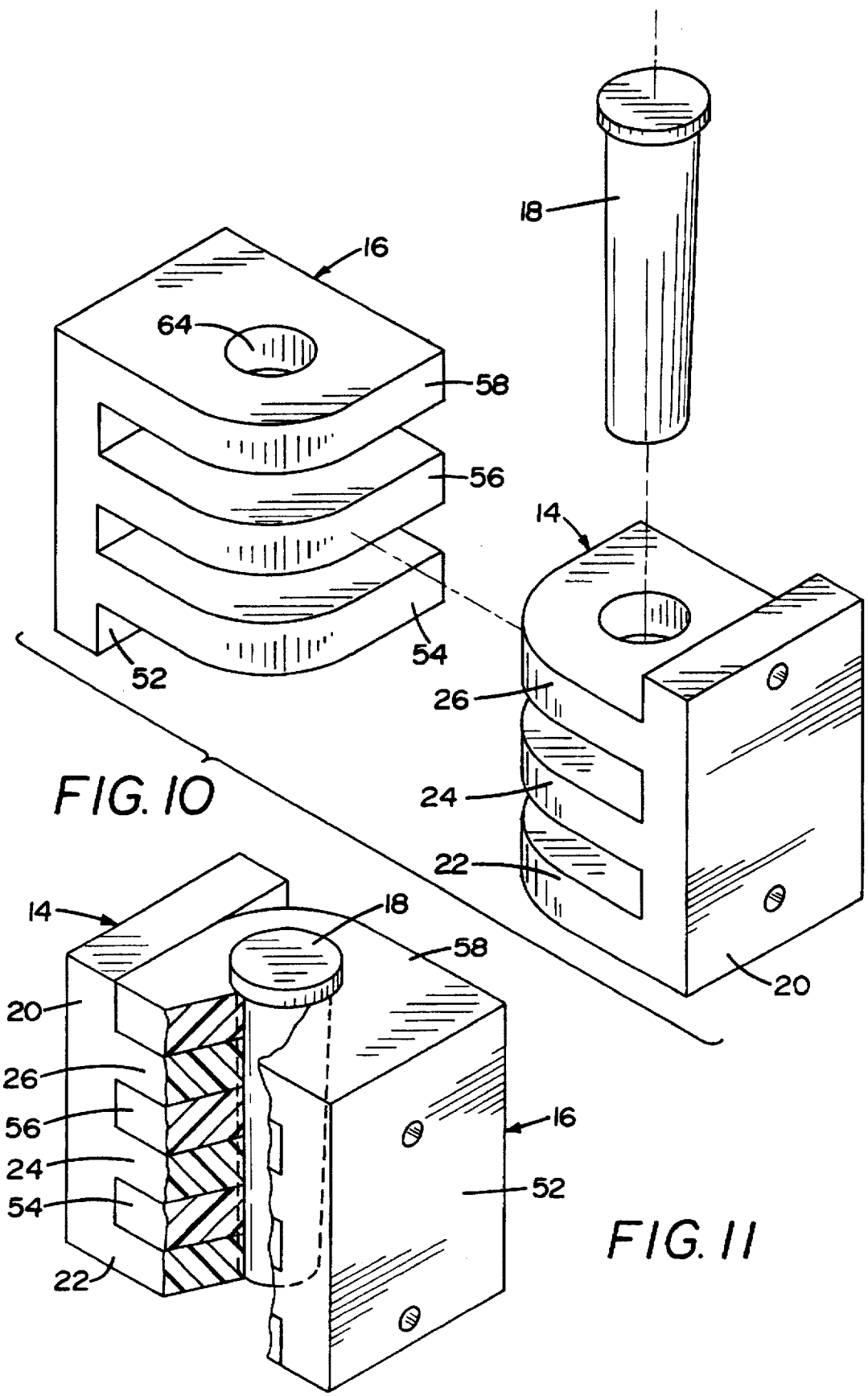

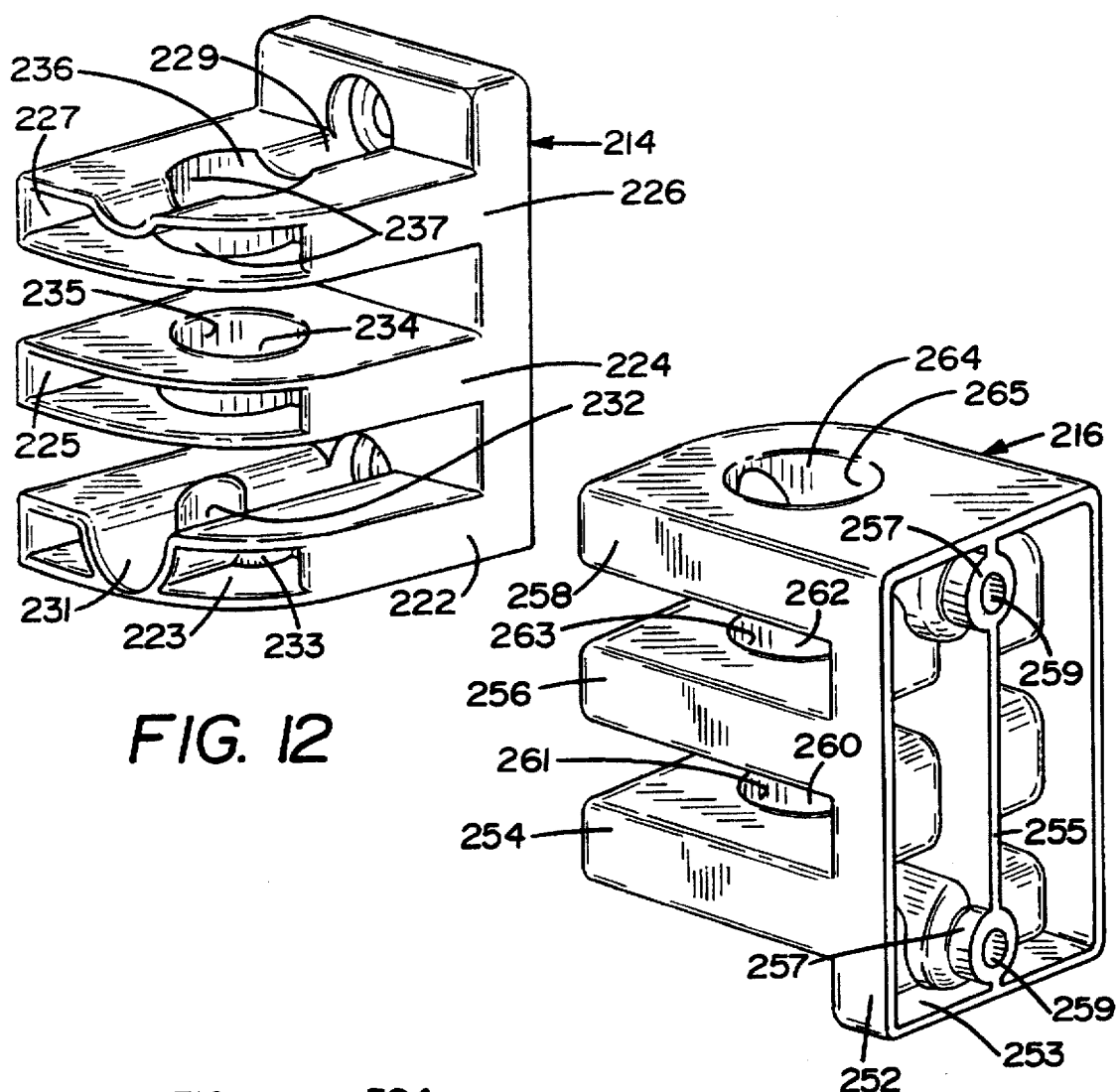
FIG. 12
FIG. 13
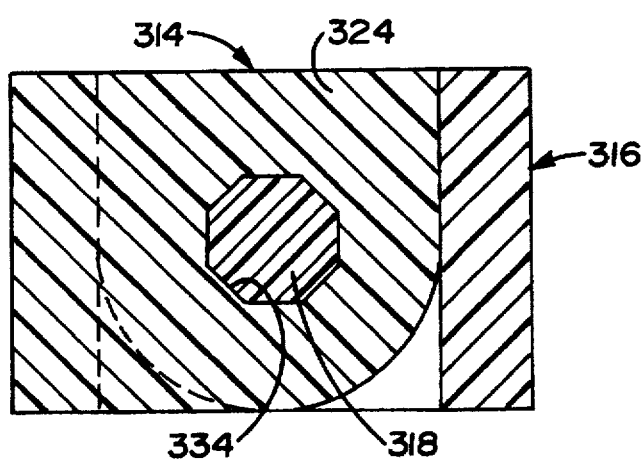
FIG. 14

FURNITURE, FURNITURE MANUFACTURING METHOD, AND CONNECTOR ASSEMBLY

BACKGROUND OF THE INVENTION

The connectors of the invention are primarily for connecting parts together in articles of furniture such as upholstered pieces, unupholstered pieces, chairs, sofas, modular pieces, recliners, cabinets, movable partitions, screens, outdoor furniture, sofa sleepers, bed frames, platform beds, tables, etc. The connectors may also be used in building construction, or for mounting or assembling components in recreational vehicles and marine vessels.

Important advantages are realized in furniture and other products which can be readily assembled and disassembled. Assembly can be done at the manufacturing site, at the wholesale distribution point, at the retail store, or at the customer's location. When a component is damaged, it can be replaced simply by removing it and replacing it with a new component which is provided with similar connectors. The system is particularly useful in furniture which is rented, sold by direct marketing, or used in government facilities and educational institutions.

The connectors according to the invention are manufactured relatively easily and inexpensively, and they are compact and lightweight to facilitate shipment and storage. Identical units can be used for left and right-hand connections, so few items are needed in inventory. Components can be assembled and disassembled many times with no adverse effect to the connectors.

SUMMARY OF THE INVENTION

The invention relates to a novel connector assembly for connecting a first part to a second part, an article of furniture in which two parts are connected together by the novel connector assembly, and a method of constructing an article of furniture which utilizes such a connector assembly.

The novel connector assembly includes a first connector block which is rigidly mountable on the first part, a second connector block which is rigidly mountable on the second part, and a tapered pin which connects the first connector block to the second connector block. The first connector block includes a first base plate and at least two parallel tongues which are rigidly supported on the first base plate in spaced apart relation. The second connector block includes a second base plate and at least one tongue which is rigidly supported on the second base plate. The tongue of the second connector block is positioned in the space between the tongues of the first connector block. The upper and lower surfaces of the tongue of the second connector block are proximate to upper and lower surfaces of the tongues of the first connector block. Each of the tongues has a pin-receiving opening. The pin-receiving openings of the first and second connector blocks are aligned with each other and they have transverse dimensions which decrease progressively from one tongue to another. The tapered pin extends through the pin-receiving openings and it engages the tongues to rigidly interconnect the first connector block and the second connector block.

The connector assembly has many optional but important features. The connector blocks are preferably formed of plastic which includes a glass fiber filler. The tapered pin engages the tongues with sufficient friction to prevent the tapered pin from moving in its axial direction and to prevent the connector blocks from pivoting about the tapered pin. The tongue of one connector block has a side edge which faces the base of the other connector block and is shaped to prevent pivoting movement of the second connector block relative to the first connector block. Additionally or alternatively, each tongue has a peripheral surface which can face toward the base of the other connector block and is shaped to permit pivoting movement of the second connector block relative to the first connector block during installation, before the pin exerts friction to prevent such movement.

The second connector block preferably has at least two tongues. Three tongues on each connector block are preferred. Each of the tongues has a thickness which is substantially less than its lateral dimensions. Mutually facing surfaces of adjacent tongues are spaced apart no more than about 0.030 inch; and, the tongues extend laterally around the pin-receiving openings for distances which are at least about 0.4 D, where D is the lateral dimension of the pin-receiving opening.

In some embodiments, the tongues are tapered and their maximum transverse cross sectional dimensions are adjacent to their respective bases. The upper and lower surfaces of each tongue converge toward each other in transverse and longitudinal cross sections. At least portions of mutually facing upper and lower surfaces of the tongues are parallel to each other when the base plates are perpendicular to each other, and when the base plates are parallel to each other.

The pin-receiving openings have truncated conical internal surface areas which are frictionally engaged by the pin, and the pin-receiving opening of greatest lateral dimension has a transverse dimension which is at least about ½ inch.

The tapered pin has a shoulder which has greater lateral dimensions than any of the pin-receiving openings, thus preventing insertion of the pin beyond the shoulder; and, the tapered pin has a taper which is substantially equal to a #3 Morse taper.

The base has fastener holes for receiving fasteners which mount the connector block on a part, and at least one of the tongues may have an access passage aligned with a fastener hole to receive a tool which is used for fastening the base to a part.

According to one embodiment of the invention, the tapered pin and the pin-receiving openings are noncircular in cross section so that the pin provides a fixed angular orientation of the second connector block relative to the first connector block. The tapered pin and the pin-receiving openings can be in the shape of identical equilateral polygons to provide more than one fixed angular orientation of the second connector block relative to the first connector block.

An article of furniture according to the invention includes a first part, a second part, and a connector assembly as described above in this Summary which connects the first part to the second part. Preferably, the article of furniture is a seating unit with a back piece, two side pieces, a front piece, and four connector assemblies which connect the pieces together. The preferred pieces are upholstered components.

The method according to the invention is used to construct an article of furniture which has a first part and a second part. The method includes the steps of attaching to one part a first connector block of the type described above in this Summary, attaching to the other part a second connector block of the type described above in this Summary, bringing the first and second connector blocks together so that the tongue of the second connector block is positioned in the space between the tongues of the first connector block and the openings in the tongues are approximately aligned, and inserting a tapered pin in the openings until it engages the tongues with sufficient friction to prevent movement of the tapered pin relative to the first connector block and relative to the second connector block. Preferably, the article of furniture has four parts and there are four connector assemblies with which these method steps are performed. The article of furniture is a knockdown seating unit and the parts include a back component, a first side component, a second side component, and a front component. In this case, four connector assemblies are used, and the steps described above are performed with each of them. All four parts are simultaneously engaged with a deck frame or other positioning guide when the tapered pins are driven into the tongues until they exert sufficient friction to prevent movement of the tapered pin relative to the interconnected connector blocks.

BRIEF DESCRIPTION OF THE DRAWING

FIG. 4 is a plan view, partially in section, of the connector blocks on two furniture parts prior to their interconnection;

FIG. 5 is a view similar to FIG. 4, showing the elements after the two parts are interconnected;

FIG. 6 is a view similar to FIG. 5, but showing the connector blocks mounted in reverse positions so that one connector block is able to swivel relative to the other connector block;

FIG. 10 is an exploded perspective view showing the components of the connector assembly of FIGS. 2–6 and 7;

FIG. 11 is a fragmentary perspective view of the connector assembly of FIG. 10, looking at the opposite end thereof, wherein the blocks are connected together at a 180° angle as shown in FIG. 6;

FIG. 12 is a front perspective view of an injection molded connector block according to the invention;

FIG. 13 is a rear perspective view of an injection molded connector block which is connectable to the connector block of FIG. 12; and FIG. 14 is a sectional view of an embodiment of the invention in which the tapered pin and the openings which receive it have octagonal cross sections.

DETAILED DESCRIPTION

Figure 1:
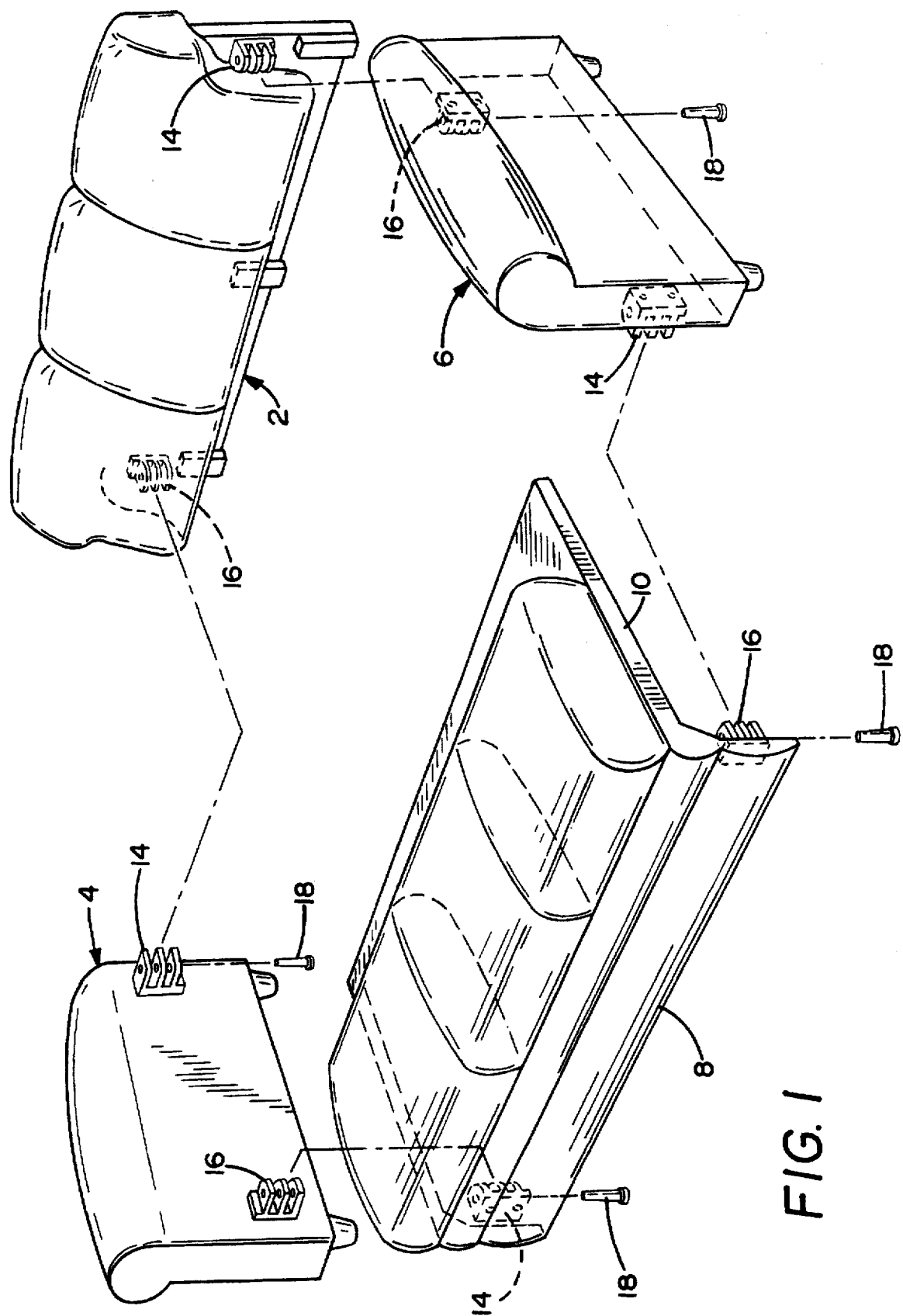
FIG. 1 is an exploded perspective view of a knockdown sofa which is constructed in accordance with the invention.

FIG. 1 shows a knockdown sofa which includes a back frame 2, two sides 4 and 6, and a front rail 8. A deck 10 is fastened to the front rail 8 in the illustrated embodiment, but it is possible to provide a separate drop-in deck or a sofa sleeper mechanism if desired.

The upholstered sofa components 2, 4, 6 and 8 are connected together by four connector assemblies which each include a first connector block 14, a second connector block 16, and a tapered pin 18 which locks together the respective blocks. The connector blocks are rigidly mounted on the respective sofa components by screws or other suitable fasteners.

Figure 2:
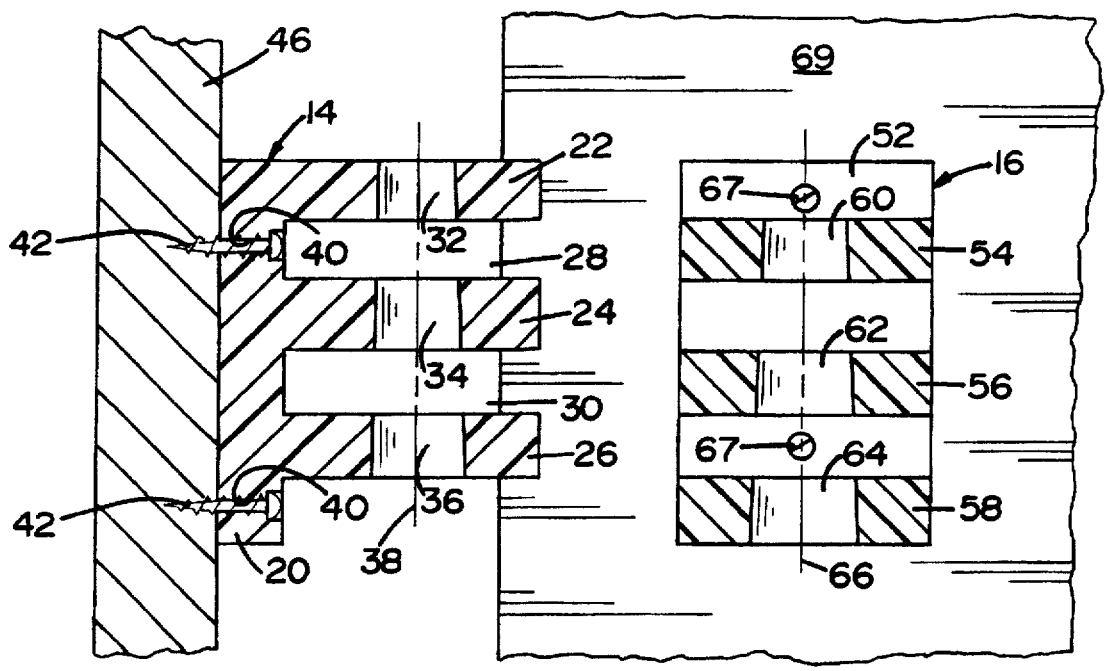
FIG. 2 is a sectional view showing connector blocks mounted on two furniture parts, prior to their interconnection.

Two connector blocks 14 and 16 of a connector assembly are shown in FIG. 2, unconnected but in proximity to each other. The first connector block 14 of this assembly includes a base plate 20 and three parallel tongues 22, 24, and 26 which are rigidly supported on the base plate 20. Each tongue has a thickness which is substantially less than its lateral dimensions. Spaces 28 and 30 are provided between the tongues for receiving mating tongues of the second connector member 16. The tongues have tapered openings 32, 34, and 36, concentric with axis 38, for receiving a tapered pin. The greatest lateral dimension of these openings (i.e. the diameter in the case of a circular opening) is at least about ½ inch, and the tongues extend around their respective openings at least about 0.4D, where D is the lateral dimension of the opening.

The base plate 20 is provided with two through holes 40 for screws 42, rivets, or other fasteners which connect the connector block to a part 46 which may be an upholstered furniture component, a wooden panel, a table part, a cabinet part, or other element which is to be connected to another element.

The second connector block 16 has a base plate 52, three parallel tongues 54, 56, and 58 rigidly supported on the base plate, and tapered openings 60, 62, and 64 which extend through the tongues. These openings are concentric with respect to an axis 66. The connector block 16 is mounted by screws or other fasteners on a part 69 to which the part 46 is to be connected.

Figure 3:
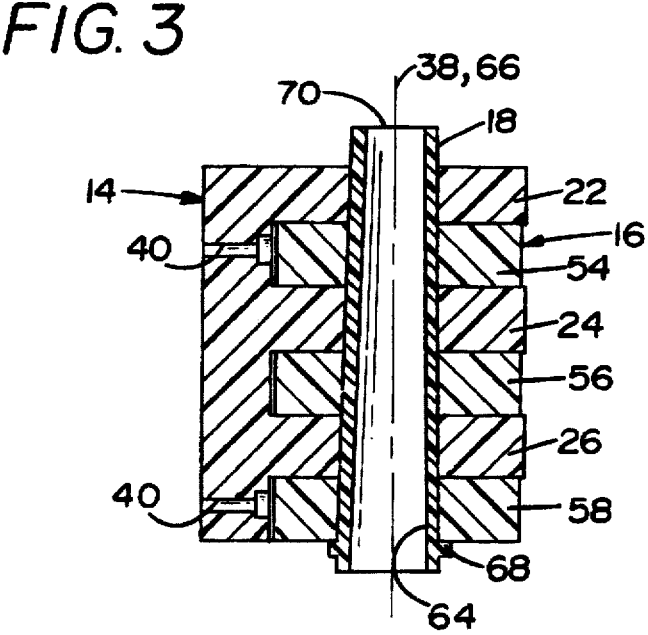
FIG. 3 is a view similar to FIG. 2, showing the connector blocks after they are interconnected according to the invention.
Figure 7:
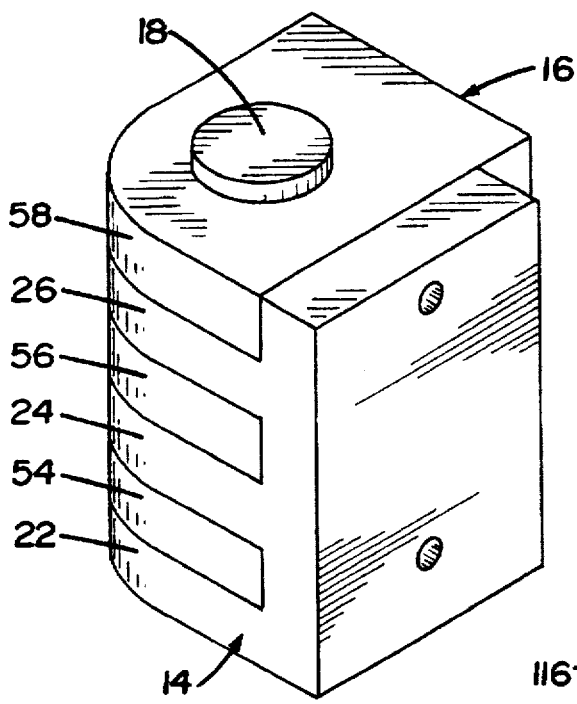
FIG. 7 is a perspective view of two connector blocks assembled as shown in FIGS. 3 and 5, but inverted so that the taper pin is driven downwardly rather than upwardly through the openings in the connector block tongues.

FIG. 3 shows the connector blocks 14 and 15, oriented 90° relative to each other, and connected and locked together by a tapered pin 18. The tongues 54 and 56 of the second block 16 fit into the spaces 28 and 30 between the tongues 22, 24 and 26 of the first block 14. The upper and lower surfaces of the tongues 54 and 56 are proximate to the adjacent upper and lower surfaces of the tongues 22, 24, and 26. The axes 38 and 66 are coincident so the tapered openings in the tongues of block 14 are aligned with the tapered openings in the tongues of block 16 as shown in FIG. 3.

In FIG. 3, it can be seen that the transverse dimensions of the openings decrease upwardly within each tongue and progressively from one tongue to another. The minimum diameter of each opening is substantially identical to the maximum diameter of the opening which is above it. The openings collectively form a truncated conical surface which has a taper which is no greater than 2° relative to the axes of the openings, and is preferably a #3 Morse friction taper. Such a taper is 0.60235 inch per foot (1° 26' 16") relative to the axis of the opening or the axis of the pin. Other friction tapers and mechanical tapers can be used, provided the latter are used with a suitable retainer. The term "friction taper" is used in the art to identify tapers in which the tapered parts are retained together solely due to friction, in contrast to "mechanical tapers" which have a larger angle and require a supplemental retainer such as a nut or bolt to retain the tapered parts together in the course of normal use. The force required to release a friction taper connection is nearly as high (90%) as the force required to establish the connection, whereas a mechanical taper connection is releasable by a force which is much less than the force required to establish the connection.

The tapered pin 18 has been driven upwardly through the openings to bring the axes 38 and 66 into coincidence. The pin 18 engages the tongues of both connector blocks 14 and 16 to rigidly interconnect the connector blocks 14 and 16. The tapered pin 18 engages the tongues with sufficient friction to prevent the pin from moving in its axial direction and to prevent the connector blocks from pivoting about the pin. Friction prevents movement of the pin 18 relative to both of the connector blocks 14 and 16, thus also preventing movement of the blocks 14 and 16 relative to each other.

When utilizing materials such as plastics with low coefficients of friction, it is particularly desirable to provide a large surface area of frictional contact between the taper pin and the walls of the tongue openings. In one embodiment, the area of frictional contact between the pin and the connector blocks is 52.5 square centimeters. When the pin is fully inserted there is an interference fit of approximately 0.24 mm, but the pin is easily removed. The extent of interference will vary depending on the materials used, the coefficients of friction, and the surface area in which frictional engagement occurs.

The pin 18 has a head 68 which is slightly larger than the maximum diameter of the opening 64. The small end 70 of the pin 18 projects beyond the tongues a sufficient distance that it can be tapped to release the pin. The head of the pin is sufficiently large to provide a shoulder which has greater lateral dimensions than any of the pin-receiving openings. This prevents the pin from being driven an excessive distance into the overlapping tongues.

The tongues are preferably shaped so that the connector can be used either as a fixed 90° connector or a variable angle connector which can be locked at any selected angle within a pivotal range of movement from 90° to 180°. As shown in FIG. 4 the peripheral edge of the tongue 22 of the first connector block 14 includes an end edge 80 and two side edges 82 and 84. One side edge 82 extends to a square corner 86, and the other side edge 84 extends to a rounded corner 88. All of the tongues 22, 24, and 26 have identical peripheral edges.

The tongues 54, 56, and 58 of the second connector block 16 also have peripheral edges which are identical to each other. As shown in FIG. 4, the tongue 54 has an end edge 90 and two side edges 92 and 94. Side edge 92 forms a square corner with the end edge 90, and side edge 94 forms a rounded corner with the end edge 90.

When the connector is assembled as shown in FIG. 5, the base 52 of block 16 is perpendicular to the base 20 of block 14. The side edge 82 of the tongue 22 and the corresponding side edges of the tongues 24 and 26 abut and are parallel to the surface 96 of the base 52 of the block 16. The side edge 92 of the tongue 54 of the second block 16 abuts the surface of the base plate 20 of the first block. There are similar abutting side edges on the tongues 56 and 58. This prevents relative rotation between the connector block 14 and 16, even if the taper pin were not frictionally retained in the openings.

When the connector is assembled reversely as shown in FIG. 6, the blocks 14 and 16 can swivel relative to each other until they are locked together by friction exerted by the pin 18. At this orientation, the round-cornered side edge 84 on block 14 faces the base 52 of block 16, and the round-cornered side edge 94 of block 16 faces the base 20 of block 14. These shapes permit pivoting movement of the connector block 16 relative to connector block 14 during installation before the pin 18 exerts friction to prevent such movement. As shown in FIG. 6, swing movement is possible from the 90° position shown in solid lines to the 180° position shown in dot-dash lines, or to any intermediate position such as the one shown in dotted lines. When a desired angular position is established, the pin 18 is tapped by a hammer or other tool. This frictionally engages the pin 18 with all of the tongues 32, 34, 36, 54, 56, 58, thus locking the pin 18 to both blocks 14 and 16 so that the connector is locked in the desired angular position.

Connector blocks according to the invention can be made by injection molding of plastic. In accordance with normal molding practices, the walls of such blocks will be inclined relative to the directions of mold movement to facilitate ejection from the mold. A typical "draf" is 0.5 degrees. The effect of this is illustrated diagrammatically in FIGS. 8 and 9 which, for illustrative purposes, show solid tongues with exaggerated tapers. In practice, the tapers are about 0.5° relative to the orthogonal axes of the block, and the blocks have internal cavities as will be explained in connection with FIGS. 12 and 13. Each of the tongues is tapered so that its upper and lower surfaces converge toward each other in transverse and longitudinal cross-sections, and the maximum transverse cross section of each tongue is adjacent to its respective base.

Figure 8:
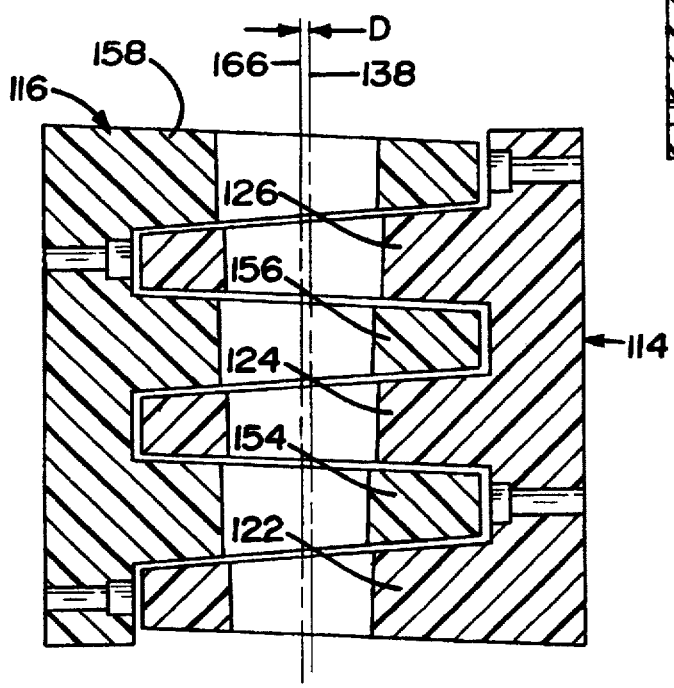
FIG. 8 is a sectional view showing two connector blocks with tapered tongues which are at a relative angle of 90°, prior to insertion of a tapered pin.

In FIG. 8, the bases of blocks 114 and 116 are set at 90° relative to each other. The block 116 is seen in section along its central longitudinal plane, and the block 114 is shown in transverse cross section through its tongues 122, 124 and 126. These tongues taper laterally in both directions, so that one half of each upper and lower surface is substantially parallel to the surface which it faces on a tongue 154, 156, 158 on the block 116. These surfaces are spaced apart, but this spacing is greatly exaggerated in FIGS. 8 and 9. The axis 138 of the openings in the tongues of block 114 is parallel to the axis 166 of the openings in the tongues of block 116. These two axes 138 and 166 are spaced apart by a distance D. A tapered pin is inserted into the aligned openings and tapped to bring the axes 138 and 166 into coincidence. This moves the upper and lower surfaces of the tongues 154, 156, and 158 on block 116 into contact with one half of each facing upper and lower surface of the tongues 122, 124, and 126 on the block 114, and it places the tapered pin under compression. The pin frictionally engages the tongues of both blocks, so that the pin is retained on the blocks and the blocks are locked together.

Figure 9:
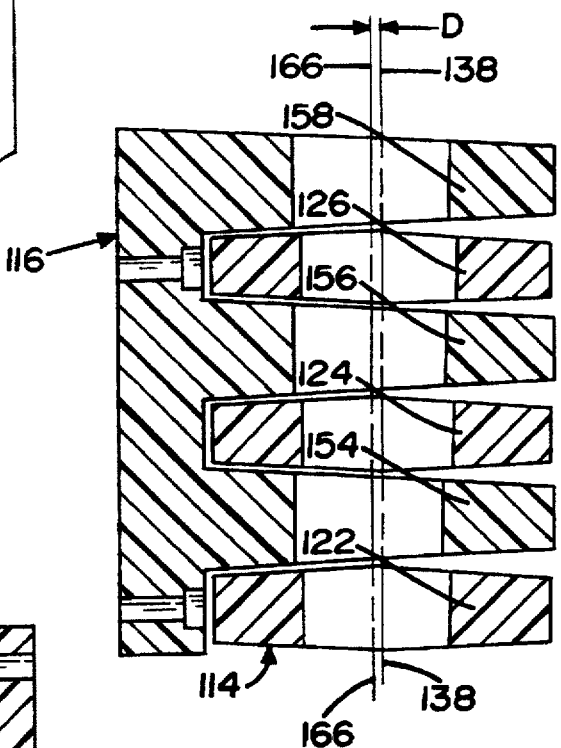
FIG. 9 is a sectional view showing two connector blocks with tapered tongues which are at a relative angle of 180°, prior to insertion of a tapered pin.

FIG. 9 shows connector blocks 114 and 116 with their bases disposed at 180° relative to each other. At this stage of assembly, the mutually facing upper and lower walls of the respective tongues 122, 124, 126, 154, 156, 158 are substantially parallel to each other in the sectioned plane. When a taper pin is inserted through the openings and tapped into secure frictional retentive condition, the blocks 114 and 116 are pulled together into precise alignment. The parts to which the blocks are connected will be fixed relative to each other by virtue of the contact between adjacent upper and lower surfaces of the tongues, the frictional contact between the pin and the tongues of the two connector blocks, and in some cases by the abutment of the side edges of the tongues of one block against the base of the other block.

FIGS. 12 and 13 and respectively show front and rear views of connector blocks 214 and 216 made by injection molding. Cores have been used in the molding process so that, to reduce weight and to conserve material, the blocks have internal cavities in their bases and in their tongues. FIG. 12 shows a connector block 214 which has cavities 223, 225, and 227 in its tongues 222, 224, and 226. Inside each tongue cavity, there is a generally cylindrical wall (respectively designated 233, 235, 237) with a truncated conical interior surface which is engageable by the tapered pin. These surfaces form the walls of the pin-receiving openings 232, 234 and 236. To facilitate access of screwdrivers or other tools when mounting the connector blocks on a part, longitudinal grooves 229 and 231 are formed in the tongues as shown at 229 in FIG. 12.

FIG. 13 shows a cavity 253 in the base 252 of the connector block 216. In this cavity, there is a web 255 associated with two bosses 257 which have openings 259 for receiving screws or other mounting fasteners. The connector block 216 has three hollow tongues 254, 256 and 258 in which the pin-receiving openings 260, 262 and 264 are surrounded by walls 261, 263 and 265 with truncated conical interior surfaces.

FIG. 14 illustrates an embodiment in which the taper pin 318 and the tongue openings exemplified by opening 334 in tongue 324 are noncircular so the shape of the pin prevents pivotal movement between the interconnected blocks 314 and 316. In this drawing, the pin 318 and the openings are octagonal. This permits placement of the connector blocks at predetermined intervals of 45°. Other cross sections are possible. For example, the pin may be circular with a protruding longitudinal key portion which fits into a similar keyway in the connector blocks to hold the connector blocks at only one possible orientation. A pin having a cross section which is an equilateral twelve-sided polygon permits positioning of the blocks at predetermined positions which are 30° apart.

When assembling a knockdown sofa which utilizes the invention, the upholstered components are preliminarily assembled with the taper pins placed loosely in the openings of their respective connector blocks. A seat deck or other member is attached to or engaged with the components which are to be connected. The seat frame can be rectangular or trapezoidal. It can be attached to the front rail as shown in FIG. 1, or it can be a separate piece which is dropped in place and held by cleats or stretchers attached to the front rail and the back frame or back rail. The seat frame acts as a positioning guide to simultaneously engage all four parts and precisely position them. It establishes a proper angular relationship between the furniture components and between the blocks of each connector assembly. Thus, the shape of the seat frame acts as a gauge or templet which establishes the relative positioning between the front, sides and back of the furniture piece. Then, the taper pins are tapped with a hammer or other tool to lock them pins frictionally to the connector blocks, and this locks the connector blocks to each other via the pin. When properly tapped into position, the pins will stay in an engaged condition even if the connector assemblies are oriented so that the smaller ends of the pins are uppermost.

The components of the connector assembly can be made of various materials including plastic or metal, and they can be produced by conventional manufacturing techniques such as casting, molding, or machining. For high volume production, injection molding is the preferred manufacturing process. Plastic parts are preferred because their elastic memory makes them less susceptible to permanent deformation than metallic parts. They can be disconnected and reconnected many times without significant loss of function. Nylon 6 which is impact modified and glass reinforced is a preferred material due to its tensile strength, compressive strength, and impact resistance.

From the foregoing explanation, it will be recognized that the invention provides an uncomplicated, effective, durable and relatively inexpensive connector system. Furniture made according to the invention can be easily and repeatedly assembled and disassembled. The method of the invention is uncomplicated, effective, and economical.

Persons familiar with the field of the invention will realize that the invention can take many forms other than those described in this specification. The elements of the connector assembly can be made of metal rather than plastic. The axes of the tongue openings can be slanted or horizontal rather than vertical. The tongues may have square corners exclusively so that the connectors cannot be pivoted during installation. Furniture made according to the invention includes cabinets, tables, beds and other pieces. Accordingly, it is emphasized that the invention is not limited to the disclosed embodiments. It encompasses many other structures and methods which fall within the spirit of the following claims.

I claim:

1. A connector assembly for connecting a first part to a second part, said connector assembly comprising, a first connector block which is rigidly mountable on the first part, a second connector block which is rigidly mountable on the second part, and a tapered pin which connects the first connector block to the second connector block;

said first connector block including a first base plate and having at least two parallel tongues which are rigidly supported on the first base plate in spaced apart relation so that a space is provided between the tongues; each of the tongues having an upper surface, a lower surface, and peripheral surfaces;

said second connector block including a second base plate and having at least one tongue which is rigidly supported on the second base plate, said tongue of the second connector block having an upper surface, a lower surface, and peripheral surfaces;

said tongue of the second connector block being positioned in the space between the tongues of the first connector block, said upper and lower surfaces of the tongue of the second connector block being proximate to upper and lower surfaces of the tongues of the first connector block;

each of the tongues having a pin-receiving opening of truncated conical shape therein, said pin-receiving openings of the first and second connector blocks having axes which are aligned with each other and having transverse dimensions which decrease progressively from one tongue to another;

said tapered pin extending through the pin-receiving openings and engaging the tongues to align and rigidly interconnect the first connector block and the second connector block to that movement of the connector blocks relative to each other is prevented, said tapered pin when driven through the opening bringing the axes of the openings of the first connector block into coincidence with the axes of the openings of the second connector block to align the first connector block and the second connector block, said tapered pin frictionally engaging the tongues with sufficient friction to prevent the tapered pin from moving in its axial direction.

2. A connector assembly according to claim 1 wherein a peripheral surface of the tongue of one connector block engages the base of another connector block to orient the connector blocks at a fixed relative position at which their bases are at an angle of 90° relative to each other.

3. A connector assembly according to claim 1 wherein the tongues are shaped to permit pivoting movement of the second connector block relative to the first connector block during installation and before the tapered pin exerts sufficient friction on the tongues.

4. A connector assembly according to claim 1 wherein the tongues are shaped to prevent pivoting movement of the second connector block relative to the first connector block during installation and before the tapered pin exerts sufficient friction on the tongues.

5. A connector assembly according to claim 1 wherein each of the tongues has a thickness, measured parallel to the pin, which is substantially less than its lateral dimensions, measured in a plane perpendicular to the pin.

6. A connector assembly according to claim 1 wherein the base has fastener holes therein for receiving fasteners which mount the connector block on a said part, and at least one of the tongues has an access passage aligned with a fastener hole to receive a tool for fastening the base to a said part.

7. A connector assembly according to claim 1 wherein mutually facing surfaces of adjacent tongues are spaced apart no more than about 0.030 inch.

8. A connector assembly according to claim 1 wherein the pin-receiving opening of greatest lateral dimension, has a transverse dimension, measured in a plane perpendicular to the pin, which is at least about ½ inch.

9. A connector assembly according to claim 1 wherein the tongues extend laterally around the pin-receiving openings for distances, measured in a plane perpendicular to the pin, which are at least about 0.4 D, where D is the lateral dimension of the pin-receiving opening, measured in a plane perpendicular to the pin.

10. A connector assembly according to claim 1 wherein the tongues are tapered and their maximum transverse cross sectional dimensions are adjacent to their respective bases.

11. A connector assembly according to claim 10 wherein the tongues are hollow.

12. A connector according to claim 1 wherein each of the tongues is tapered so that its upper and lower surfaces converge toward each other in transverse cross sections, said upper and lower surfaces of the tongues being shaped so that at least portions of mutually facing upper and lower surfaces are parallel to each other when the second base plate is at an angle of 90° relative to the first base plate.

13. A connector according to claim 1 wherein each of the tongues is tapered so that its upper and lower surfaces converge toward each other in longitudinal cross sections, said upper and lower surfaces of the tongues being shaped so that at least portions of upper and lower surfaces are parallel to each other when the second base plate is at an angle of 90° relative to the first base plate.

14. A connector according to claim 1 wherein the second connector block has at least two said tongues.

15. A connector assembly according to claim 1 wherein both of the connector blocks are formed of plastic.

16. A connector assembly according to claim 15 wherein the plastic includes a glass fiber filler.

17. A connector assembly according to claim 1 wherein each of the tongues has an internal cavity, and a wall which is within said cavity and surrounds the pin-receiving opening.

18. A connector assembly according to claim 1 wherein the tapered pin has a shoulder which has greater lateral dimensions than any of the pin-receiving openings, to prevent insertion of the pin beyond the shoulder.

19. A connector according to claim 1 wherein the tapered pin has a taper which is substantially equal to a #3 Morse taper.

20. A connector according to claim 1 wherein the tapered pin and the pin-receiving openings are noncircular in cross section so that the pin provides a fixed angular orientation of the second connector block relative to the first connector block.

21. A connector according to claim 20 wherein the tapered pin and the pin-receiving openings are in the shape of identical equilateral polygons to provide more than one fixed angular orientation of the second connector block relative to the first connector block.

22. A connector assembly according to claim 1 wherein the tapered pin engages the tongues of both connector blocks with sufficient friction to prevent the connector blocks from pivoting about the tapered pin.

23. A connector assembly according to claim 1, wherein each said tongue has a length which extends horizontally from said base, a width which is horizontal and perpendicular to said length, and a thickness which is measured vertically, said length and said width being greater than said thickness.

24. A connector assembly for connecting a first part to a second part, said connector assembly comprising, a first connector block which is rigidly mountable on the first part, a second connector block which is rigidly mountable on the second part, and a tapered pin which connects the first connector block to the second connector block;

said first connector block including a first base plate and having at least two parallel tongues which are rigidly supported on the first base plate in spaced apart relation so that a space is provided between the tongues; each of the tongues having an upper surface, a lower surface, and peripheral surfaces;

said second connector block including a second base plate and having at least one tongue which is rigidly supported on the second base plate, each said tongue of the second connector block having an upper surface, a lower surface, and peripheral surfaces;

said second connector block having a tongue with an upper surface which is proximate to a lower surface of a tongue of the first connector block, said second connector block having a tongue with a lower surface which is proximate to an upper surface of a tongue of the first connector block;

each of the tongues having a pin-receiving opening of truncated conical shape therein, said pin-receiving openings of the first and second connector blocks having axes which are aligned with each other and having transverse dimensions which decrease progressively from one tongue to another;

said tapered pin extending through the pin-receiving openings and engaging the tongues to align and rigidly interconnect the first connector block and the second connector block so that movement of the connector blocks relative to each other is prevented, said tapered pin when driven through the openings bringing the axes of the openings of the first connector block into coincidence with the axis of the opening of the second connector block to align the first connector block with the second connector block, said tapered pin frictionally engaging the tongues with sufficient friction to prevent the tapered pin from moving in its axial direction.

25. A connector assembly according to claim 24 wherein a peripheral surface of the tongue of one connector block engages the bass of another connector block to orient the connector blocks at a fixed relative position at which their bases are an angle 90° relative to each other.

26. A connector assembly according to claim 24 wherein the tongues are shaped to permit pivoting movement of the second connector block relative to the first connector block during installation and before the tapered pin exerts sufficient friction on the tongues.

27. A connector assembly according to claim 24 wherein the tongues are shaped to prevent pivoting movement of the second connector block relative to the first connector block during installation and before the tapered pin exerts sufficient friction on the tongues.

28. A connector assembly according to claim 24 wherein each of the tongues has a thickness, measured parallel to the pin, which is substantially less than its lateral dimensions, measured in a plane perpendicular to the pin.

29. A connector assembly according to claim 24 wherein the pin-receiving opening of greatest lateral dimension, has a transverse dimension, measured in a plane perpendicular to the pin, which is at least about ½ inch.

30. A connector assembly according to claim 24 wherein the tongues extend laterally around the pin-receiving openings for distances, measured in a plane perpendicular to the pin, which are at least about 0.4 D, where D is the lateral dimension of the pin-receiving opening, measured in a plane perpendicular to the pin.

* * * * *